United States Patent
Lu et al.

(10) Patent No.: US 9,608,963 B2
(45) Date of Patent: Mar. 28, 2017

(54) SCALABLE INTERMEDIATE NETWORK DEVICE LEVERAGING SSL SESSION TICKET EXTENSION

(71) Applicant: Cisco Technology, Inc., San Jose, CA (US)

(72) Inventors: Chengning Lu, San Jose, CA (US); Eitan Bennun, Sunnyvale, CA (US); Maypalli Jayadev Kumar, Fremont, CA (US); Nikhil Ravindra Rajguru, San Jose, CA (US); Shamira Joshua, Sunnyvale, CA (US); Richard Lin, San Jose, CA (US); Elisa Caredio, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/695,427

(22) Filed: Apr. 24, 2015

(65) Prior Publication Data
US 2016/0315913 A1 Oct. 27, 2016

(51) Int. Cl.
*H04L 29/06* (2006.01)
(52) U.S. Cl.
CPC ........ *H04L 63/0281* (2013.01); *H04L 63/166* (2013.01); *H04L 65/1069* (2013.01); *H04L 63/0464* (2013.01)
(58) Field of Classification Search
CPC .......................... H04L 63/166; H04L 63/0281
See application file for complete search history.

(56) References Cited

U.S. PATENT DOCUMENTS 7,206,932 B1 * 4/2007 Kirchhoff ............. H04L 63/029
                                                713/152
7,529,933 B2 * 5/2009 Palekar ............... H04L 63/0428
                                                380/255

(Continued)

FOREIGN PATENT DOCUMENTS

EP        2207302 A1    7/2010

OTHER PUBLICATIONS

T. Dierks et al. "The Transport Layer Security (TLS) Protocol Version 1.1", RTFM, Inc., Apr. 2006, 87 pages.

(Continued)

*Primary Examiner* — Dao Ho
(74) *Attorney, Agent, or Firm* — Edell, Shapiro & Finnan, LLC (57) ABSTRACT

An intermediary network device receives a request for a secure communication session between an endpoint server and an endpoint client through the network device. The secure session between the endpoint server and the endpoint client is divided into a first session and a second session. The first session is between the endpoint server and the network device. The second session is between the network device and the endpoint client. The network device receives a first session ticket from the endpoint server. A session state of a proxy client in the first session, including the first session ticket, is determined. The network device also determines a session state of a proxy server in the second session. The combination of the session state of the proxy client, including the first session ticket, and the session state of the proxy server are encapsulated as part of a second session ticket.

17 Claims, 7 Drawing Sheets

(56) References Cited

U.S. PATENT DOCUMENTS

| | | | |
|---|---|---|---|
| 7,707,415 B2* | 4/2010 | Braskich | H04L 63/0892 |
| | | | 380/270 |
| 9,124,629 B1 | 9/2015 | Bowen | |
| 2002/0035681 A1* | 3/2002 | Maturana | H04L 63/0428 |
| | | | 713/151 |
| 2007/0143614 A1* | 6/2007 | Holtmanns | H04L 63/067 |
| | | | 713/171 |
| 2007/0192845 A1* | 8/2007 | Lankheim | H04L 67/16 |
| | | | 726/12 |
| 2012/0005727 A1* | 1/2012 | Lee | H04L 9/321 |
| | | | 726/3 |
| 2013/0191631 A1* | 7/2013 | Ylonen | H04L 63/1483 |
| | | | 713/153 |
| 2014/0143855 A1* | 5/2014 | Keoh | H04L 63/166 |
| | | | 726/14 |

OTHER PUBLICATIONS

J. Salowey et al. "Transport Layer Security (TLS) Session Resumption without Server-Side State", Nokia Siemens Networks, Jan. 2008, 20 pages.

T. Dierks "The Transport Layer Security (TLS) Protocol Version 1.2", RTFM, Inc., Aug. 2008, 104 pages.

International Search Report and Written Opinion in corresponding International Application No. PCT/US2016/028083, mailed Jun. 27, 2016, 10 pages.

* cited by examiner

SCALABLE INTERMEDIATE NETWORK DEVICE LEVERAGING SSL SESSION TICKET EXTENSION

TECHNICAL FIELD

The present disclosure relates to secure communication session through intermediary network devices.

BACKGROUND

The Transport Layer Security (TLS) protocol includes a session ticket extension that allows a secure communication session between two computers to resume with an abbreviated handshake based on a pre-known state for a limited time. The session ticket extension offloads the caching of the application server session state to the application client. An intermediary network device may be included in the path of a TLS/Secure Sockets Layer (SSL) connection to provide additional services, such as a firewall, intrusion detection/prevention, and/or load balancing.

To participate in a session between an endpoint client and an endpoint server secured with the TLS security protocol, an intermediary device will typically interpose itself and create two separate SSL/TLS sessions. The intermediary device creates one TLS session between the application client and a proxy server at the intermediary device. A proxy client at the intermediary device initiates the second TLS session with the application server.

The Internet Engineering Task Force (IETF) Request For Comments (RFC) 5077 describes TLS session ticket extension specifications over the TLS protocol. RFC 5077 describes an application server sending a new session ticket to the application client before the Change Cipher Spec message. This ticket is opaque to the application client and is used to establish SSL/TLS connections of the same session with the application server using an abbreviated handshake.

DESCRIPTION OF EXAMPLE EMBODIMENTS

Overview

A computer-implemented method is presented herein that involves receiving a request for a secure communication session between a first computing device and a second computing device through an intermediary network device. The secure communication session between the first computing device and the second computing device is divided into a first session and a second session. The first session is between the first computing device and the intermediary network device. The second session is between the intermediary network device and the second computing device. The intermediary network device receives a first session ticket from the first computing device. A session state of a proxy client in the first session, including the first session ticket, is determined. A session state of a proxy server in the second session is also determined. The combination of the session state of the proxy client, including the first session ticket, and the session state of the proxy server are encapsulated as part of a second session ticket.

Example Embodiments

The TLS protocol session ticket extension imposes challenges on the security and scalability of an intermediary network device to provide any additional services. In support of session resumption, each intermediary network device typically stores session states for the proxy server and proxy client, as well as the application ticket. Since a single network device may be an intermediary device for multiple TLS sessions, the network device stores session states and tickets for each of the TLS sessions, limiting the scalability of the network service.

The techniques presented herein provide for an intermediary network device to encapsulate the session ticket from a TLS session with an endpoint server as part of the proxy session ticket generated for the TLS session with an endpoint client. In this way, the endpoint client can cache the session ticket for both TLS sessions, and the intermediary network device is relieved of the duty to store session tickets for every TLS session that it mediates. The intermediary also encapsulates the session state of the proxy client and session state of the proxy server in the proxy session ticket that the endpoint client stores.

Figure 1:
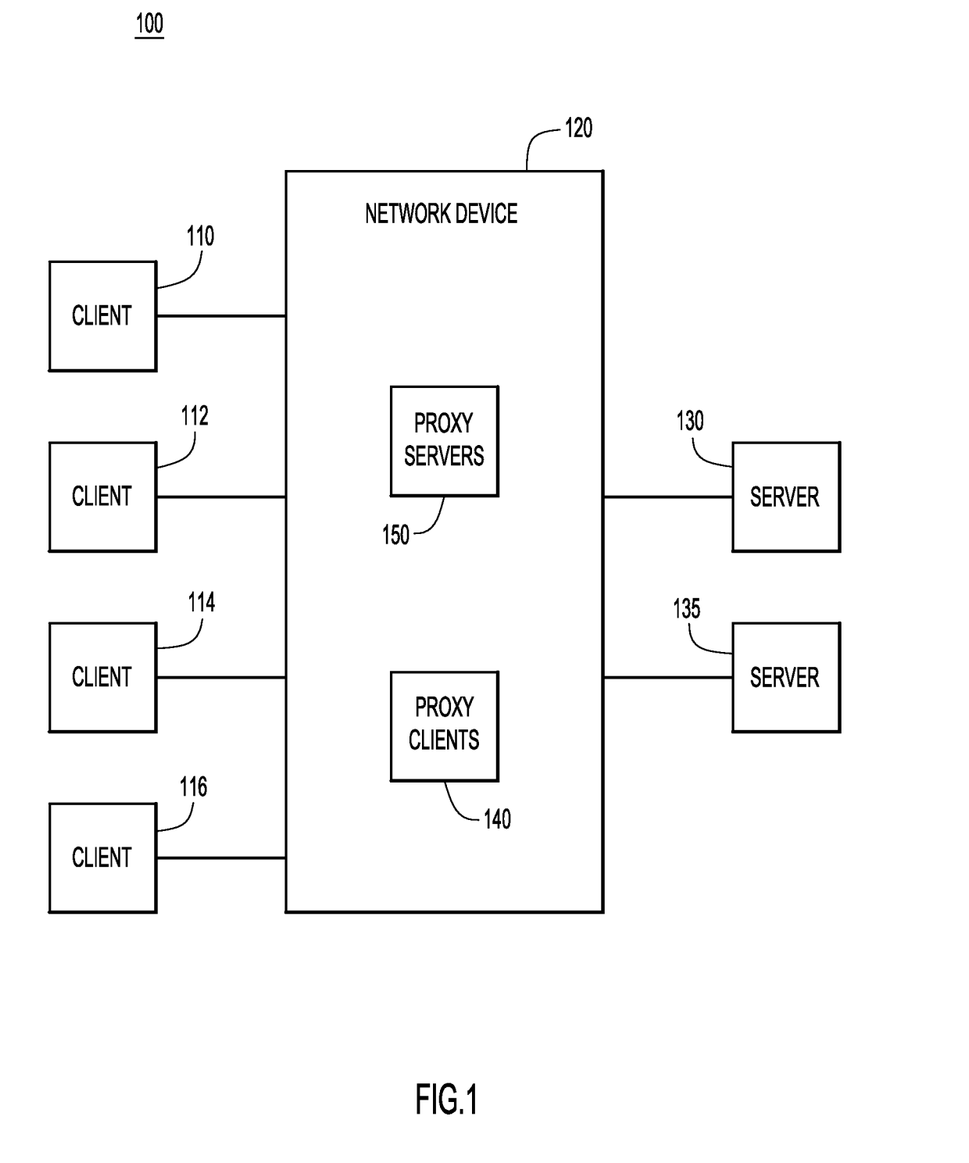
FIG. 1 is a system block diagram showing an intermediate network device between endpoint servers and endpoint clients according to an example embodiment.

Referring now to FIG. 1, a simplified block diagram of a network system 100 that uses an intermediary network device to facilitate TLS sessions between endpoint clients and endpoint servers is shown. System 100 includes a plurality of endpoint client devices 110, 112, 114, and 116, an intermediary network device 120, and endpoint servers 130 and 135. In support of the TLS protocol, the intermediary network device 120 uses proxy clients 140 to engage in secure TLS sessions with endpoint server 130 and 135. The intermediary network device 120 also uses proxy servers 150 to engage in secure TLS sessions with endpoint clients 110, 112, 114, and 116.

In one example, the endpoint client devices 110, 112, 114, and 116 and endpoints servers 130 and 135 may take a variety of forms, including a desktop computer, laptop computer, server, mobile/cellular phone, tablet computer, Internet telephone, etc. Intermediary network device 120 may be, for example, a switch or router in a variety of types of network (e.g., any combination of Internet, intranet, local area network (LAN), wide area network (WAN), wired network, wireless network, etc.) that connects computing devices, e.g., clients 110, 112, 114, and 116, and servers 130 and 135.

Figure 2:
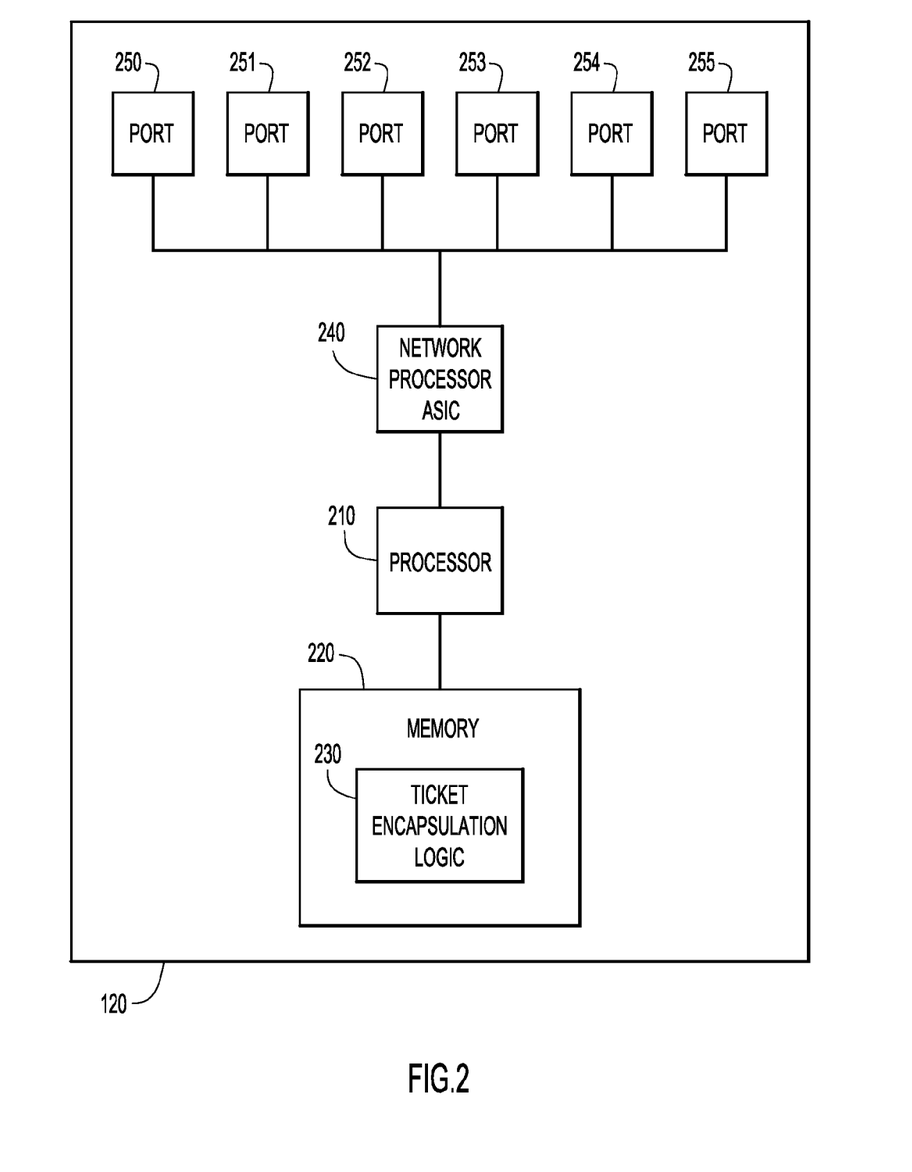
FIG. 2 is a simplified block diagram of an intermediate network device according to an example embodiment.

Referring now to FIG. 2, a simplified block diagram of an intermediary network element 120 is shown. Network element 120 includes, among other possible components, a processor 210 to process instructions relevant to processing communication packets, and memory 220 to store a variety of data and software instructions (e.g., ticket encapsulation logic 230, communication packets, etc.). The network element 120 also includes a network processor application specific integrated circuit (ASIC) 240 to process communication packets that flow through the network element 120. Network processor ASIC 240 processes communication packets to and from ports 250, 251, 252, 253, 254, and 255. While only six ports are shown in this example, any number of ports may be included in network element 120.

Memory 220 may comprise read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software comprising computer executable instructions and when the software is executed (by the processor 210) it is operable to perform the operations described herein.

Figure 3:
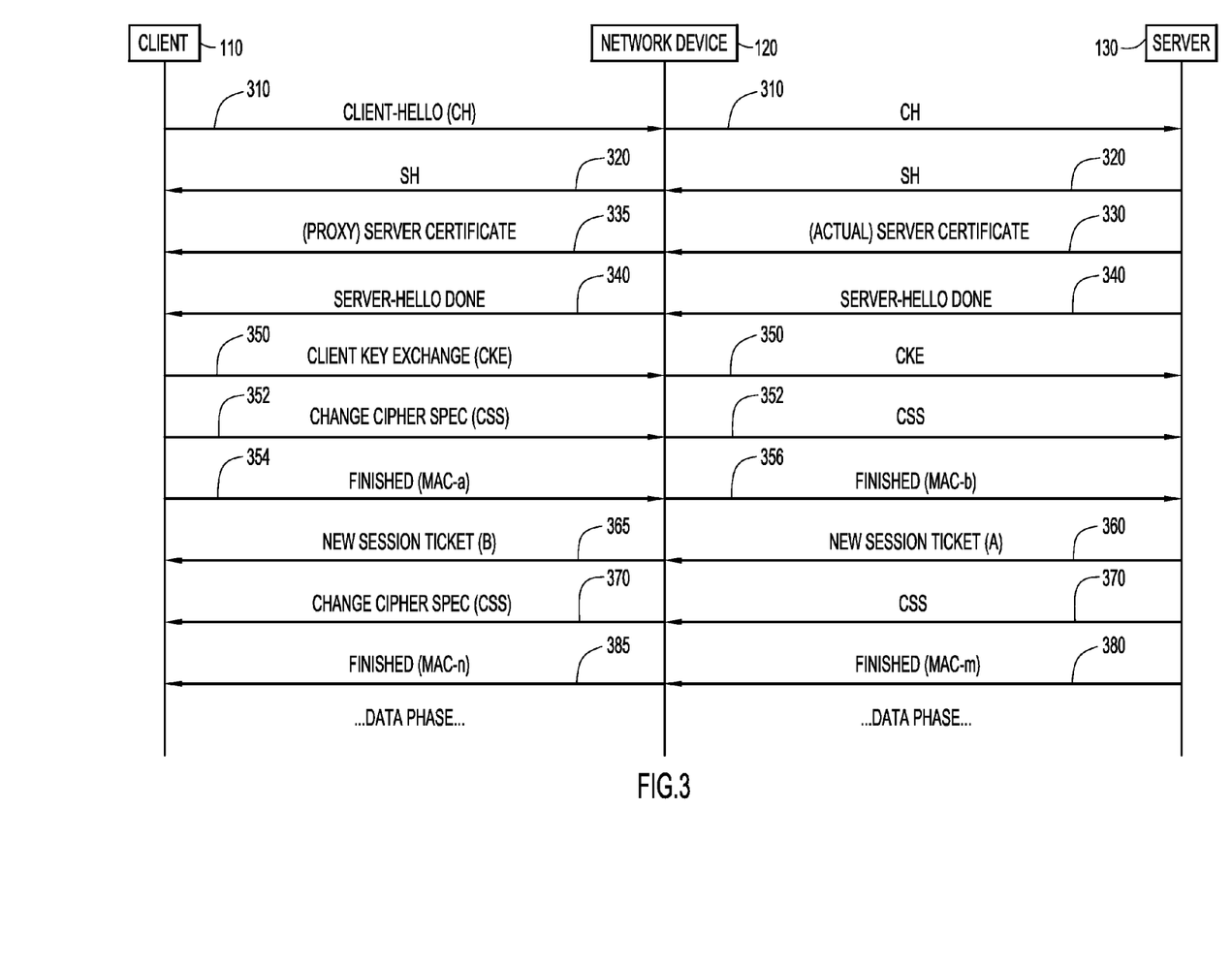
FIG. 3 is a ladder diagram showing steps of initiating a secure TLS session through an intermediate network device according to an example embodiment.

Referring now to FIG. 3, a ladder diagram for an intermediary network device 120 dividing a TLS session into two TLS sessions according to an example embodiment is shown. A client 110 initiates a handshake by sending a Client-Hello (CH) message 310 with an empty session ticket extension to a network device 120 to initiate a TLS session. The network device 120 forwards the CH message 310 to the server 130. The server 130 responds with a Server-Hello (SH) including an empty session ticket extension in message 320, which the network device 120 forwards to the client 110. The server 130 also sends its actual server certificate 330 (e.g., a certificate issued by a public certificate authority) to the network device 120. Since the network device 120 may need to modify the contents of packets in this TLS session, the network device initiates a second TLS session and sends a proxy server certificate 335 to the client 110 instead of the actual server certificate 330. The server 130 then sends a Server-Hello Done message 340, which the network device 120 forwards to the client 110. In another example, the network device 120 may generate a new Server-Hello Done message to send to the client 110.

The client 110 sends a Client Key Exchange (CKE) message 350, a Change Cipher Spec (CCS) message 352, and a Finished message 354, including a Message Authentication Code (MAC-a). The network device 120 forwards the CKE message 350 and the CCS message 352, and generates a Finished message 356, including a separate Message Authentication Code (MAC-b). In another example, the network device 120 may generate a new CKE message that is different than the CKE message 350 from the client 110, and send the new CKE message to the server 130.

The server 130 sends a new session ticket 360 to enable future session resumption for a TLS session between the server 130 and the proxy client in the network device 120. The network device 120 encapsulates the session ticket 360, as well as the session state of the proxy client and the session state of the proxy server, in a proxy session ticket 365. The network device sends the proxy session ticket 365 to the client device 110. The client device 110 caches the proxy session ticket 365, including the encapsulated session ticket 360, according to the session ticket extension protocol. Since the proxy session ticket is opaque to the endpoint client 110, the endpoint device 110 remains unaware that the original session ticket 360 is also stored with the proxy session ticket 365.

The server 130 finishes the handshake by replying with CCS message 370 and Finished message 380, including a Message Authentication Code (MAC-m). The network device 120 forwards the CCS message 370 and generates its own Finished message 385, including a Message Authentication Code (MAC-n). With the handshake finished, the data phase of the TLS communication session can now begin.

In this example, the network device 120 has initiated two secure communication channels. One secure channel is a TLS session between the client 110 and the network device 120. The second secure channel is between the network device 120 and the server 130.

In one example, the combination of the original session ticket 360, the session state of the proxy client, and the session state of the proxy server, is encrypted before being encapsulated in the proxy session ticket 365. The encryption keys for this may be specific to the network device 120, and do not have to be shared with either the endpoint client 110 or the endpoint server 130. Alternatively, one or more of the session states or the session ticket 360 may remain unencrypted when the combination is encapsulated into the proxy session ticket 365.

Figure 4:
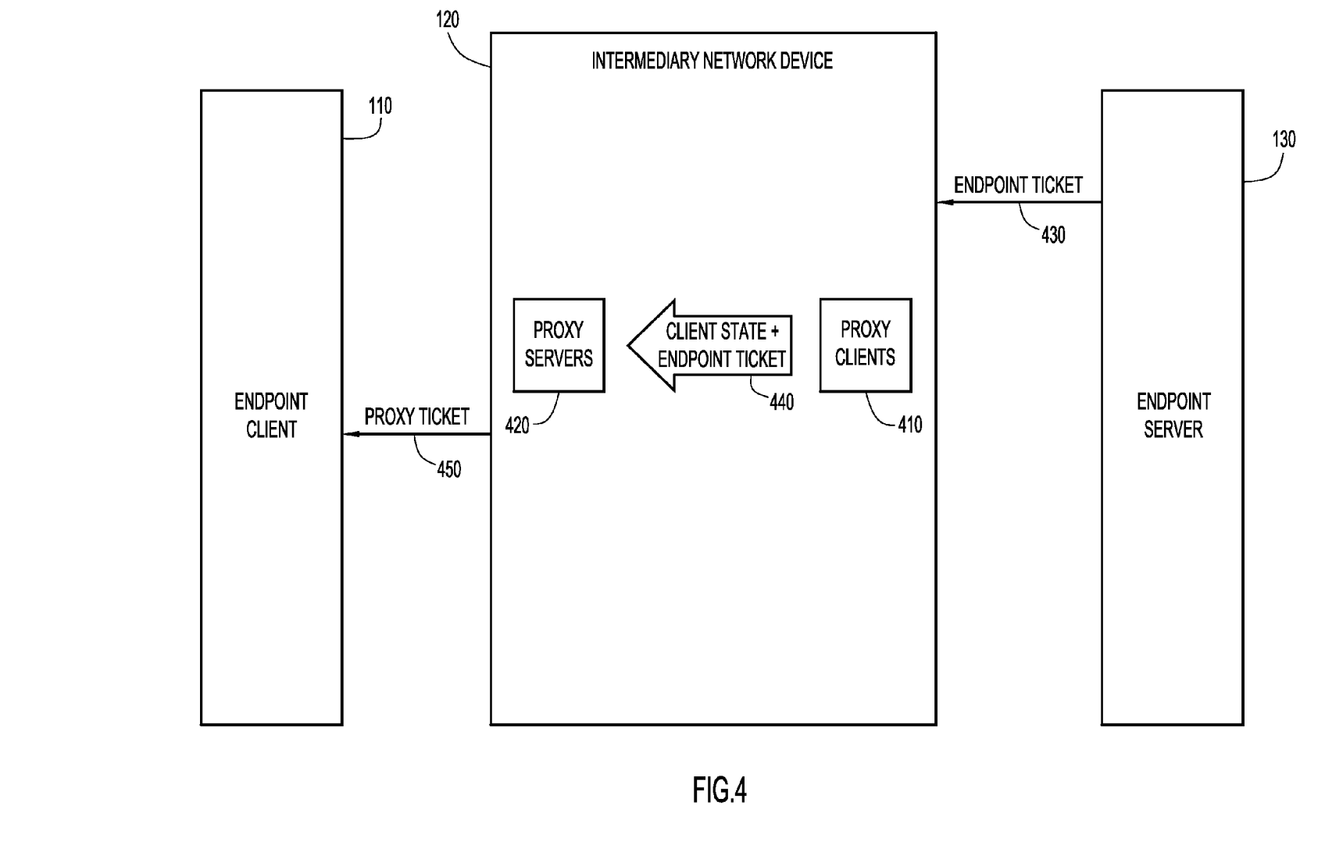
FIG. 4 is a system block diagram showing an intermediate network device encapsulating the session states and endpoint ticket according to an example embodiment.

Referring now to FIG. 4, a simplified block diagram shows an intermediary network device 120 encapsulating an endpoint server's session ticket according to one example. Intermediary network device 120 comprises a proxy client 410 to communicate with the endpoint server 130 and a proxy server 420 to communicate with the endpoint client 110. As part of the TLS session handshake that initiates the TLS session, the endpoint server 130 sends an endpoint session ticket 430. This endpoint ticket 430 will be recognized by the endpoint server 130 to resume the TLS session if the session is interrupted or closed and restarted.

The proxy client 410 receives the endpoint ticket 430 and sends the endpoint ticket 430 and the TLS session state of the proxy client 410 to the proxy server 420 as message 440. The proxy server 420 combines its own TLS session state with the session state of the proxy client 410 and the endpoint ticket 430 into a single blob input. The proxy server 420 may encrypt the blob input and encapsulates the encrypted blob into a proxy session ticket 450. The proxy server 420 then sends the proxy session ticket 450 to the endpoint client 110, and the endpoint client 110 stores the proxy session ticket 450 in a local cache according to the TLS session ticket extension protocol.

In one example, the session ticket structure described in RFC 5077 is used for encapsulating the proxy session states and the endpoint session ticket at the intermediary network device 120. The proxy server 420 may use the 'encrypted-_state' field within the structure of the proxy session ticket 450 to include the encrypted blob input of the endpoint session ticket, the proxy client session state, and the proxy server session state.

In another example, multiple intermediary network devices may be in the path between the endpoint client 110 and the endpoint server 130. Each intermediary device that needs to interpose into the secure communication session will break into the session in a manner similar to network device 120, as described above. That is, a second intermediary network device may receive the proxy session ticket 450, and encapsulate it into a third session ticket. The third session ticket will include the proxy session ticket 450 and the original endpoint session ticket 430, as well as the session states for the proxy servers and proxy clients in each of the intermediary network devices. In this way, successive intermediary network devices can continue encapsulating the session ticket that it receives into a new session ticket for the next intermediary device, or the endpoint client.

Figure 5:
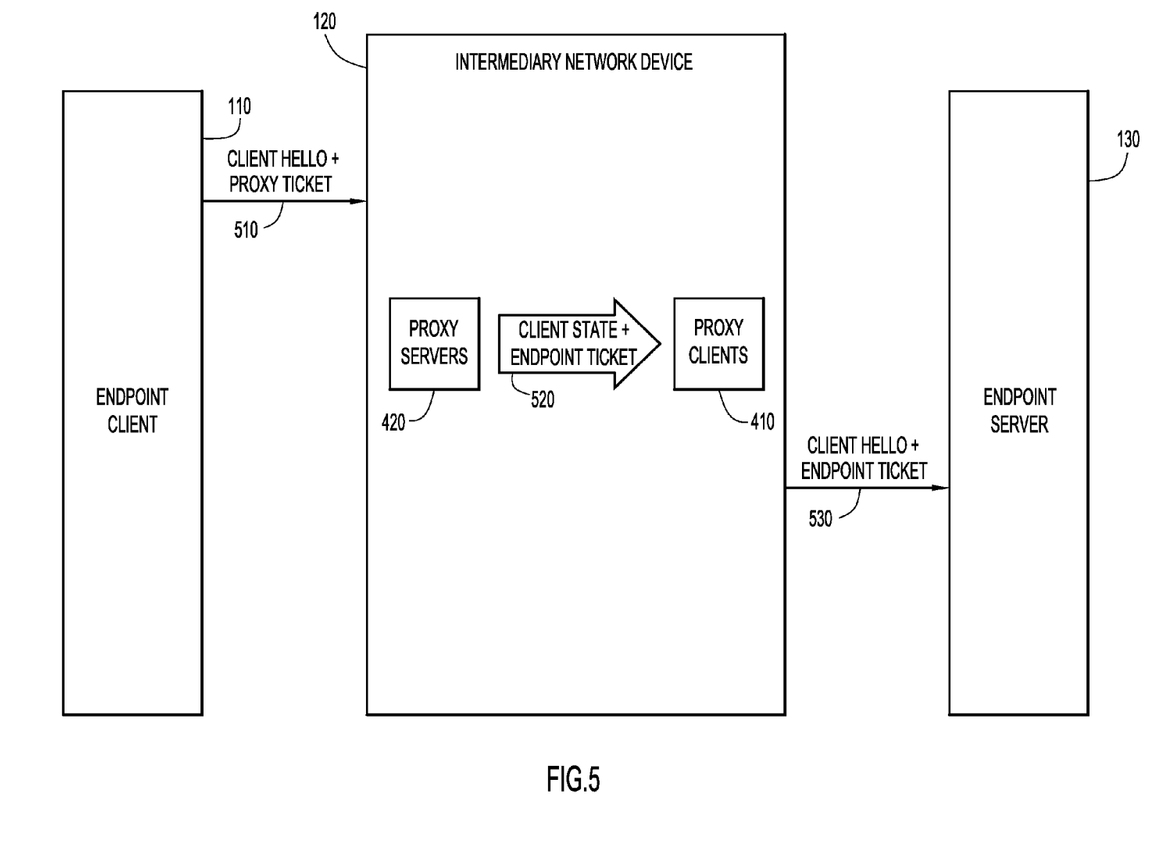
FIG. 5 is a system block diagram showing an intermediate network device resuming a TLS session through the session ticket extension according to an example embodiment.

Referring now to FIG. 5, a simplified block diagram shows the resumption of the TLS sessions using the proxy session ticket stored by the endpoint client device. To resume a suspended or interrupted TLS session, the endpoint client 110 sends a Client Hello message 510 with the proxy session ticket that was stored at the setup of the TLS session. The proxy server 420 receives the Client Hello message 510 and recovers/retrieves the proxy server session state, the proxy client state, and the endpoint session ticket that was encapsulated in the proxy session ticket. The proxy server 420 uses the recovered proxy server session state information to establish the resumed TLS session with the endpoint client 110.

The proxy client session state and endpoint session ticket are sent to the proxy client 410 as a message 520. The proxy client 410 uses the received proxy client session state to set up its session state. The proxy client 410 then generates a Client Hello message 530 including the endpoint session ticket and sends the Client Hello message 530 to the endpoint server 130 to resume the TLS session. The endpoint server 130 decrypts and validates the endpoint session ticket and resumes the TLS session between the endpoint server 130 and the proxy client 410.

In one example, the proxy server 420 may receive a proxy session ticket in a Client Hello message 510 that the proxy server 420 is unable to decrypt the session ticket. In this case, for example, if the intermediary network device 120 was not the path for the original session, then the network device 120 will remove itself from the path for this session as well.

In another example, the proxy server 420 may receive a proxy session ticket in a Client Hello message 510 that the proxy server 420 can successfully decrypt, but the endpoint server 130 cannot decrypt or recognize the encapsulated session ticket. In this case, or if the endpoint server 130 no longer supports session resumption, then the endpoint server 130 will respond with a Server Hello message indicating that a full handshake is necessary to establish a new TLS session. When the Server Hello message of the full handshake arrives at the network device 120, the proxy client 410 will discard the session state from the resumed session and proceed with the full handshake.

In a further example, the endpoint server 130 may or may not include another session ticket when resuming a previous session with an abbreviated handshake. In the case that the endpoint server 130 does include a new session ticket, the network device 120 will process the new session ticket in the same manner as it did the original session ticket, i.e., the network device 120 will encapsulate the new session ticket, the proxy client session state and the proxy server session state into a new proxy session ticket.

Figure 6:
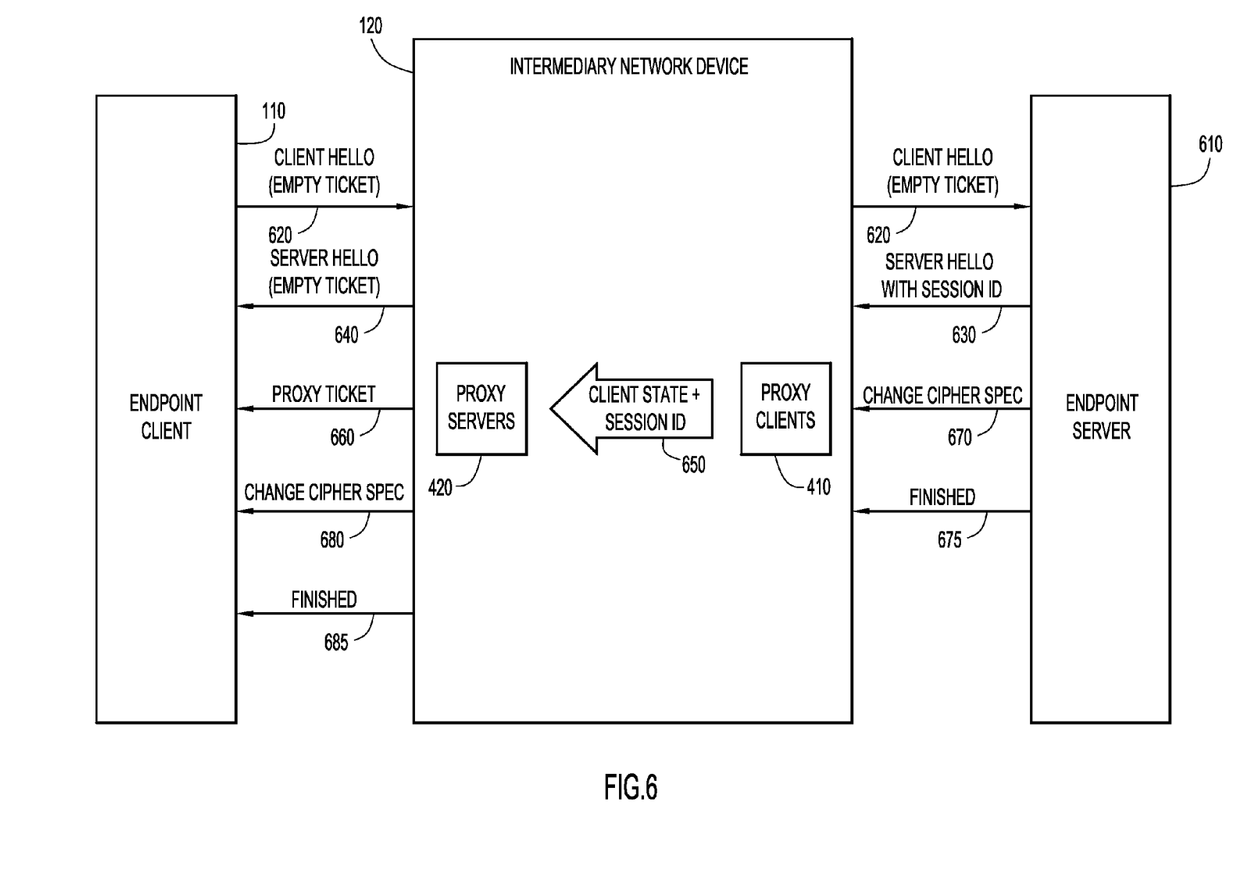
FIG. 6 is a system block diagram showing an intermediate network device encapsulating a session identifier in a proxy ticket to support legacy session resumption according to an example embodiment.

Referring now to FIG. 6, a simplified block diagram shows an intermediary network device 120 coordinating session resumption with endpoints that support different SSL/TLS resumption protocols. In this example, the endpoint client supports session resumption with session tickets, but the endpoint server 610 does not support session tickets. The endpoint server 610 substantially only supports session resumption using a session ID. To initiate the secure communication session, the endpoint client 110 sends a Client Hello message 620 including an empty session ticket extension, indicating support for session ticket resumption. Alternatively, the Client Hello message may be sent to try to resume a session by including a non-empty session ticket extension in the Client Hello message. The network device receives the message 620 and forwards it to the endpoint server 610.

Since the endpoint server 610 does not support session resumption using a session ticket, the server 610 ignores any session ticket in the session ticket extension of the Client Hello message 620. The server 610 responds with a Server Hello message 630 including a session ID, but no session ticket extension. The proxy server 420 in the network device 120 creates a Server hello message 640 including an empty session ticket and sends it to the endpoint client 110.

The proxy client 410 in the network device 120 receives the message 630 and passes the session ID and the session state of the proxy client 410 to the proxy server 420 in a message 650. The proxy server 420 encapsulates the combination of the session ID, the session state of the proxy client 410, and the session state of the proxy server 420 into a proxy session ticket 660. The proxy server 420 sends the proxy session ticket 660 to the endpoint client 110 to enable the endpoint client 110 to resume the session with the proxy server 420. The endpoint client 110 stores the proxy session ticket 660 in a local cache.

The endpoint server 610 sends a CCS message 670 and Finished message 675 to complete the session handshake with the proxy client 410. The proxy server 420 completes the session handshake with the endpoint client 110 by sending a CCS message 680 and Finished message 685. In one example, the CCS message 680 is a one byte message marking the end of the session handshake and the start of the secure/encrypted session. Alternatively, SSL extensions, such as Next Protocol Negotiation (NPN) and/or Application Layer Protocol Negotiation (ALPN), may include a portion of the application protocol handshake in the CCS message as a data payload in addition to the typical one byte CCS message. The SSL extensions affecting the data payload may be determined as part of the Client-Hello/Server-Hello capabilities negotiation of extension support. If the endpoint client 110 wants to resume the secure session, it will send a Client Hello message with the proxy session ticket 660 in the session ticket extension. The proxy server 420 recovers/retrieves the proxy server session state, the proxy client session state, and the session ID from the proxy session ticket 660. The proxy server session state is used to set up the proxy server 420 and resume the TLS session with the endpoint client device 110. The proxy client session state is used to set up the proxy client 410, which sends a Client Hello message with the recovered session ID to the endpoint server 610. The endpoint server 610 resumes the session with the appropriate session ID, and both TLS sessions are resumed.

Figure 7:
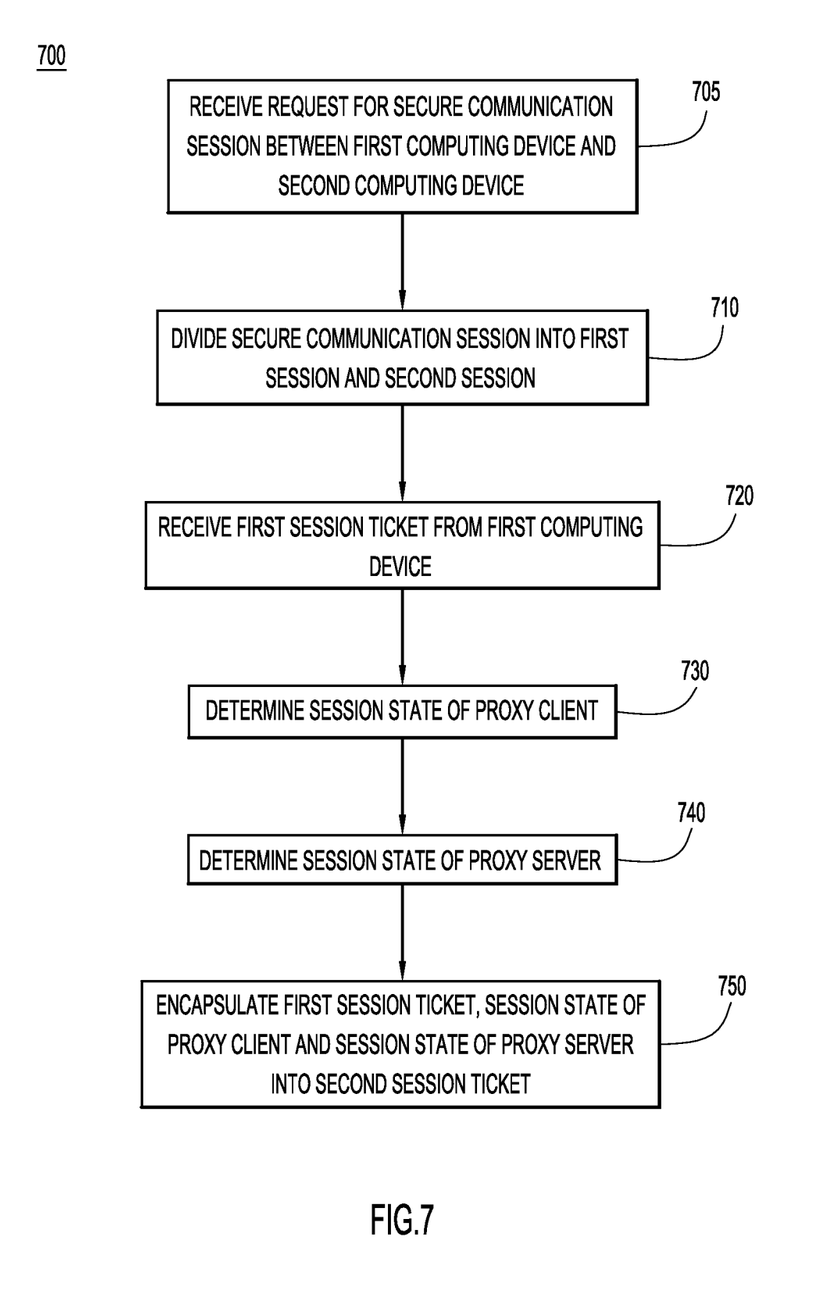
FIG. 7 is a flowchart showing the operations of an intermediate network device in encapsulating the session states and session ticket according to an example embodiment.

Referring now to FIG. 7, a flow diagram shows a process 700 in which an intermediary network device interposes into a secure TLS session such that the endpoint client device stores the session tickets necessary to resume the TLS session. In step 705, the network device receives a request (e.g., a Client-Hello message) for a secure communication session between a first computing device (e.g., endpoint server 130) and a second computing device (e.g., endpoint client 110). To interpose into the secure communication session, the network device divides the secure communication session into a first session and a second session in step 710. The first session is a secure communication session between the first computing device and a proxy client in the network device. The second session is a secure communication session between a proxy server in the network device and a second computing device. In step 720, the network device receives a first session ticket from a first computing device. The first session ticket enables the resumption of the secure communication session with an abbreviated handshake.

The network device determines the session state of the proxy client in step 730, including the first session ticket. In step 740, the network device determines the session state of the proxy server. In step 750, the network device encapsulates the session state of the proxy client including the first session ticket and the session state of the proxy server into a second session ticket that will enable the endpoint client to resume the second session with the proxy server.

In summary, an intermediary network device inserts itself into the full handshake and session resumption handshake flow. The intermediary network device in the path of an SSL/TLS handshake can leverage the session ticket caching ability of the endpoint client. The network device encapsulates the endpoint server session ticket and proxy session state information in the proxy session ticket sent to the endpoint client. This eliminates any need for the intermediary network device to store endpoint server tickets, proxy session states, or the binding between them. This increases the scalability and performance of the network devices without compromising the functionality, operability, or security.

In one example, the techniques presented herein provide for a computer-implemented method comprising receiving at an intermediary network device, a request for a secure communication session between a first computing device and a second computing device through the intermediary network device. The secure communication session between the first computing device and the second computing device is divided at the intermediary network device into a first session and a second session. The first session is between the first computing device and the intermediary network device. The second session is between the intermediary network device and the second computing device. The intermediary network device receives a first session ticket from the first computing device. A session state of a proxy client in the first session, including the first session ticket, is determined. A session state of a proxy server in the second session is also determined. The combination of the session state of the proxy client, including the first session ticket, and the session state of the proxy server are encapsulated as part of a second session ticket.

In another example, the techniques presented herein provide for an apparatus with a network interface unit and a processor. The network interface unit is configured to send and receive communications over a network. The processor is configured to receive, via the network interface, a request for a secure communication session between a first computing device and a second computing device through the intermediary network device. The processor is configured to divide the secure communication session between the first computing device and the second computing device into a first session and a second session. The first session is between the first computing device and a proxy client module. The second session is between a proxy server module and the second computing device. The processor is configured to receive, via the network interface unit, a first session ticket from the first computing device. The processor is configured to determine a session state of the proxy client module, including the first session ticket. The processor is also configured to determine a session state of the proxy server module. The processor is configured to encapsulate the session state of the proxy client module and the session state of the proxy server module as part of a second session ticket.

In yet another example, the techniques presented herein provide for one or more non-transitory computer readable storage media encoded with computer executable instructions configured to cause a processor to enable session resumption with a first session ticket from a first computing device as part of a secure communication session with a second computing device. The instructions also cause the processor to divide the secure communication session between the first computing device and the second computing device into a first session and a second session. The first session is between the first computing device and a proxy client module. The second session is between a proxy server module and the second computing device. The instructions further cause the processor to receive a first session ticket from the first computing device. The instructions cause the processor to determine a session state of the proxy client module, including the first session ticket. The instructions also cause the processor to determine a session state of the proxy server module. The instructions further cause the processor to encapsulate the session state of the proxy client module and the session state of the proxy server module as part of a second session ticket.

The above description is intended by way of example only. Various modifications and structural changes may be made therein without departing from the scope of the concepts described herein and within the scope and range of equivalents of the claims.

What is claimed is:

1. A method comprising:
   receiving at an intermediary network device, a request initiating a handshake exchange for a secure communication session between a first computing device and a second computing device through the intermediary network device;
   dividing the secure communication session between the first computing device and the second computing device into a first session between the first computing device and the intermediary network device and a second session between the intermediary network device and the second computing device;
   receiving at the intermediary network device, a first session ticket from the first computing device as part of the handshake exchange, the first session ticket enabling the intermediary device to resume the first session using a first abbreviated handshake;
   determining a session state of a proxy client in the first session, the session state of the proxy client including the first session ticket;
   determining a session state of a proxy server in the second session;
   encapsulating the session state of the proxy client and the session state of the proxy server as part of a second session ticket, the second session ticket enabling the second computing device to resume the second session using a second abbreviated handshake;
   retrieving from the second session ticket the session state of the proxy client, the session state of the proxy server, and the first session ticket;
   replicating the session state of the proxy server to resume the second session between the second computing device and the proxy server;
   replicating the session state of the proxy client to enable the first session between the proxy client and the first computing device to be resumed; and transmitting the first session ticket to the first computing device to initiate the first abbreviated handshake and resume the first session.

2. The method of claim 1, further comprising responding to the first computing device to complete the handshake exchange and initialize the first session.

3. The method of claim 1, further comprising transmitting the second session ticket to the second computing device as part of the second session between the intermediary network device and the second computing device.

4. The method of claim 3, further comprising resuming the second session by:
   receiving the second session ticket from the second computing device; and
   responding to the second computing device to resume the second session.

5. The method of claim 1, further comprising decrypting at least one of the session state of the proxy client, the session state of the proxy server, or the first session ticket.

6. The method of claim 1, further comprising encrypting at least one of the session state of the proxy client, the session state of the proxy server, or the first session ticket.

7. An apparatus comprising:
   a network interface unit configured to send and receive communications over a network; and
   a processor configured to:
   receive, via the network interface unit, a request initiating a handshake exchange for a secure communication session between a first computing device and a second computing device;
   divide the secure communication session between the first computing device and the second computing device into a first session between the first computing device and a proxy client module and a second session between a proxy server module and the second computing device;
   receive, via the network interface unit, a first session ticket from the first computing device as part of the handshake exchange, the first session ticket enabling the intermediary device to resume the first session using a first abbreviated handshake;
   determine a session state of the proxy client module, the session state of the proxy client module including the first session ticket;
   determine a session state of the proxy server module for the second session;
   encapsulate the session state of the proxy client module and the session state of the proxy server module as part of a second session ticket, the second session ticket enabling the second computing device to resume the second session using a second abbreviated handshake;
   retrieve from the second session ticket the session state of the proxy client module, the session state of the proxy server module, and the first session ticket;
   replicate the session state of the proxy server module to resume the second session between the second computing device and the proxy server module;
   replicate the session state of the proxy client module to enable the first session between the proxy client module and the first computing device to be resumed; and
   cause the network interface unit to transmit the first session ticket to the first computing device to initiate the first abbreviated handshake and resume the first session.

8. The apparatus of claim 7, wherein the processor is further configured to respond to the first computing device to complete the handshake exchange and initialize the first session.

9. The apparatus of claim 7, wherein the processor is further configured to transmit the second session ticket to the second computing device, via the network interface unit, as part of the second session between the intermediary network device and the second computing device.

10. The apparatus of claim 9, wherein the processor is further configured to resume the second session by:
    receiving the second session ticket from the second computing device; and
    responding to the second computing device to resume the second session.

11. The apparatus of claim 7, wherein the processor is further configured to decrypt at least one of the session state of the proxy client module, the session state of the proxy server module, or the first session ticket.

12. The apparatus of claim 7, wherein the processor if further configured to encrypt at least one of the session state of the proxy client module, the session state of the proxy server module, or the first session ticket.

13. One or more non-transitory computer readable storage media encoded with computer executable instructions configured to cause a processor to:
    receive a request initiating a handshake exchange for a secure communication session between a first computing device and a second computing device;
    divide the secure communication session between the first computing device and the second computing device into a first session between the first computing device and a proxy client module and a second session between a proxy server module and the second computing device;
    receive a first session ticket from the first computing device as part of the handshake exchange, the first session ticket enabling the intermediary device to resume the first session using a first abbreviated handshake;
    determine a session state of the proxy client module, the session state of the proxy client module including the first session ticket;
    determine a session state of the proxy server module for the second session;
    encapsulate the session state of the proxy client and the session state of the proxy server as part of a second session ticket, the second session ticket enabling the second computing device to resume the second session using a second abbreviated handshake;
    retrieve from the second session ticket the session state of the proxy client module, the session state of the proxy server module, and the first session ticket;
    replicate the session state of the proxy server module to resume the second session between the second computing device and the proxy server module;
    replicate the session state of the proxy client module to enable the first session between the proxy client module and the first computing device to be resumed; and
    transmit the first session ticket to the first computing device to initiate the first abbreviated handshake and resume the first session.

14. The non-transitory computer readable storage media of claim 13, further comprising computer executable instructions configured to cause the processor to transmit the second session ticket to the second computing device, via the network interface unit, as part of the second session between the intermediary network device and the second computing device.

15. The non-transitory computer readable storage media of claim 14, further comprising computer executable instructions configured to cause the processor to resume the second session by:
   receiving the second session ticket from the second computing device; and
   responding to the second computing device to resume the second session.

16. The non-transitory computer readable storage media of claim 13, further comprising computer executable instructions configured to cause the processor to decrypt at least one of the session state of the proxy client module, the session state of the proxy server module, or the first session ticket.

17. The non-transitory computer readable storage media of claim 13, further comprising computer executable instructions configured to cause the processor to encrypt at least one of the session state of the proxy client module, the session state of the proxy server module, or the first session ticket.

\* \* \* \* \*